July 2, 1968     E. W. TURNER ETAL     3,390,426
APPARATUS FOR MOLDING HOLLOW ARTICLES Filed Sept. 24, 1965     4 Sheets-Sheet 1

INVENTORS
E.W. TURNER
F.E. WILEY
BY
*Young · Grugg*
ATTORNEYS

July 2, 1968 E. W. TURNER ETAL 3,390,426
APPARATUS FOR MOLDING HOLLOW ARTICLES
Filed Sept. 24, 1965 4 Sheets-Sheet 3

INVENTORS
E. W. TURNER
F. E. WILEY

BY

*Young & Dugg*

ATTORNEYS

United States Patent Office 3,390,426
Patented July 2, 1968

3,390,426
APPARATUS FOR MOLDING HOLLOW ARTICLES
Edward W. Turner and Fred E. Wiley, Hazardville, Conn., assignors to Phillips Petroleum Company, a corporation of Delaware
Filed Sept. 24, 1965, Ser. No. 489,934
9 Claims. (Cl. 18—5)

ABSTRACT OF THE DISCLOSURE

An apparatus for forming biaxially oriented hollow thermoplastic articles comprises: a gripping means having a tapered guide for insertion into an open end of a temperature condition parison and at least two jaw members adapted to grip an open end of the parison between the jaws and the tapered guide; and a reciprocal means extending through the central portion of the gripping means, this reciprocal means having a tamping foot adapted to press against a closed off area of the parison; and means for achieving relative movement between the gripping means and the tamping foot so as to apply axial stretching to the parison. In a preferred embodiment there is provided a means for pinching said parison off to form the closed off end; the tamping foot descends so as to press the freshly closed off area of the parison against the pinching means and thereafter relative axial moxement is effected between the gripping means and the tamping foot, either by raising the gripping means or by lowering the tamping foot and pinching means, to effect axial stretching; the pinched off end of the parison is kept pressed between the tamping foot and the pinching means during this stretching. The parison is placed in a hollow mold and pressure differential created between the inner and outer walls of the parison during or subsequent to said stretching so as to cause the parison to conform to the shape of the mold. The pinching means can comprise a concentric ring of pointed jaw members arranged in a plane perpendicular to the axis of the parison and adapted to reciprocate radially. In one embodiment a cylindrical cam tube encircles the jaws comprising the gripping means and is adapted to move axially forward and backward engaging cam surfaces on these jaws so as to open and close these jaws.

Figure 1:
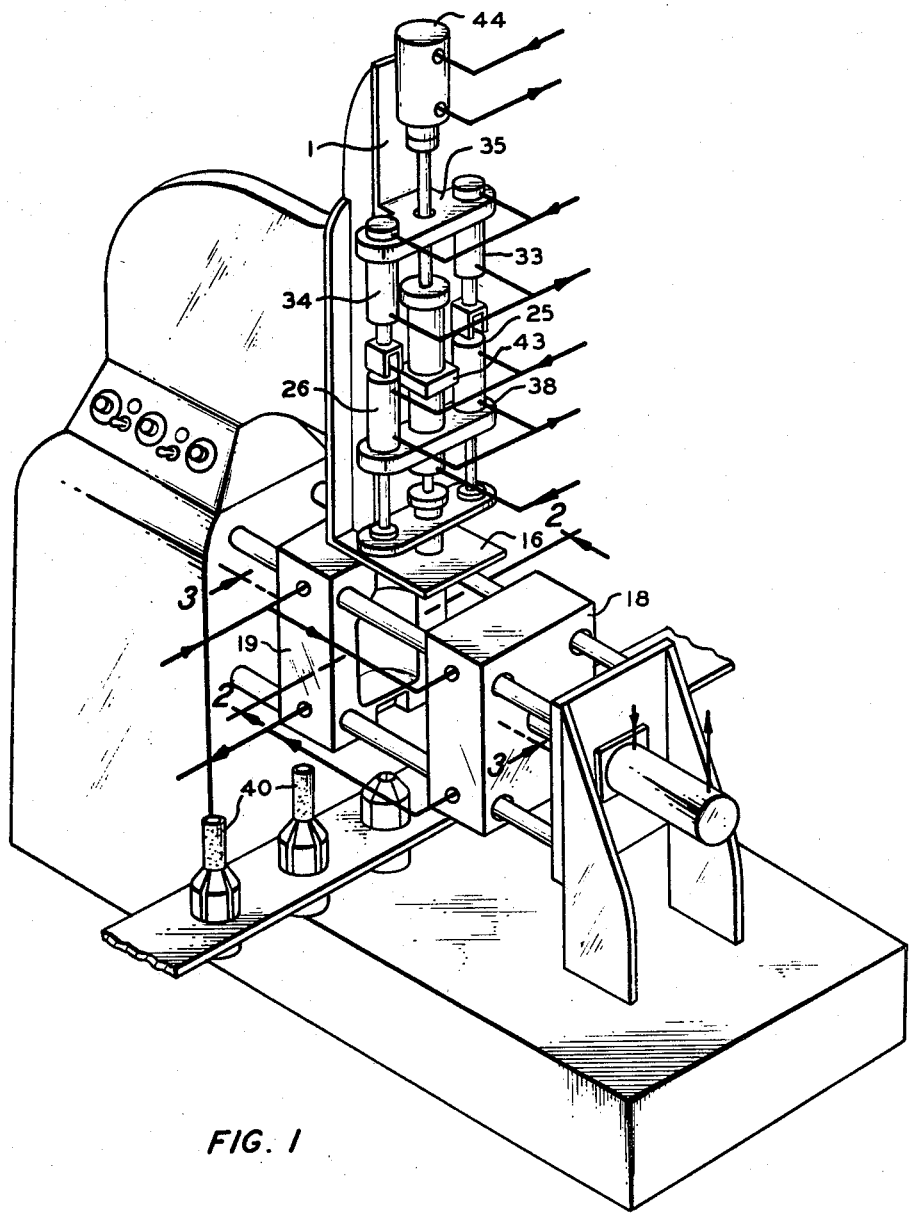
Figure 2:
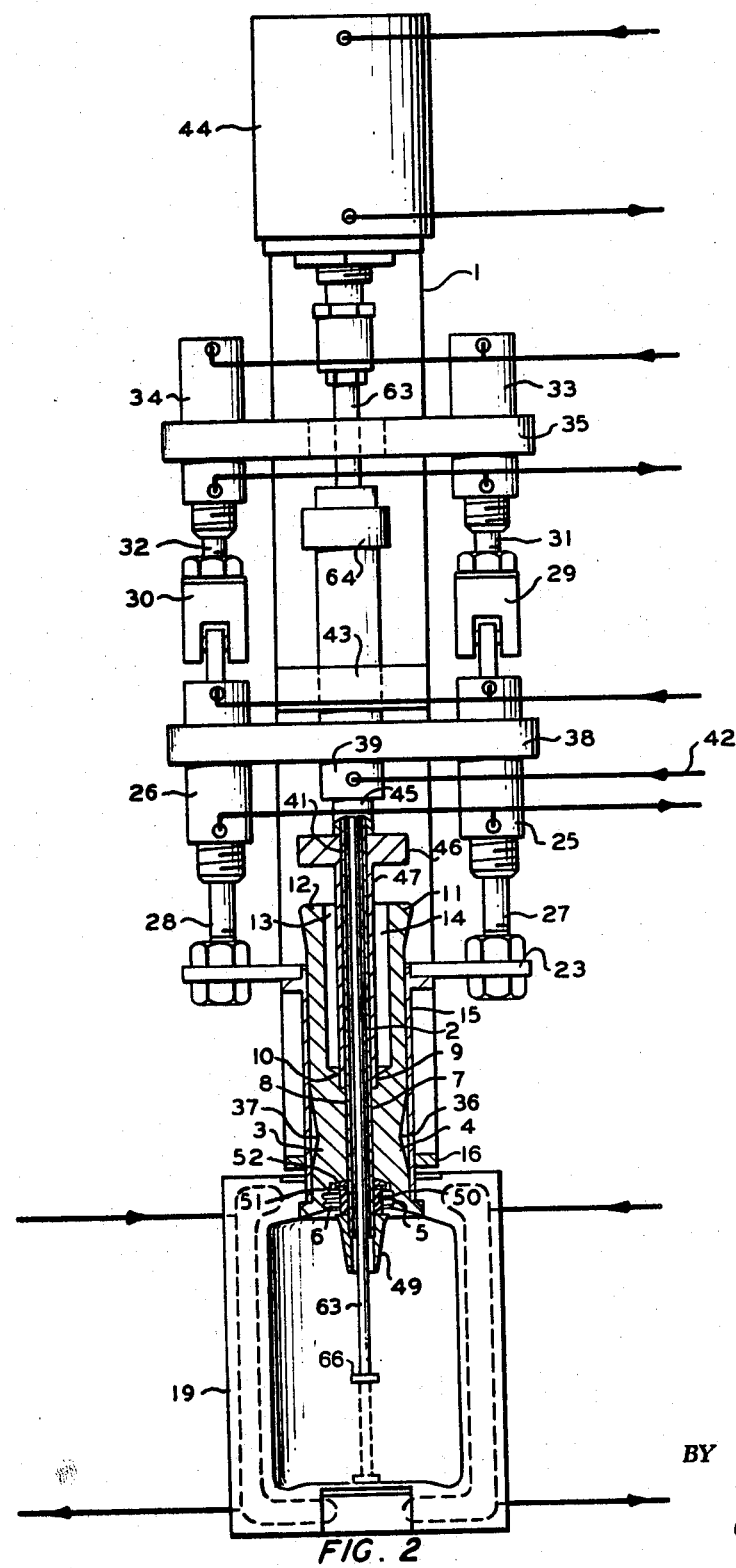
Figure 3:
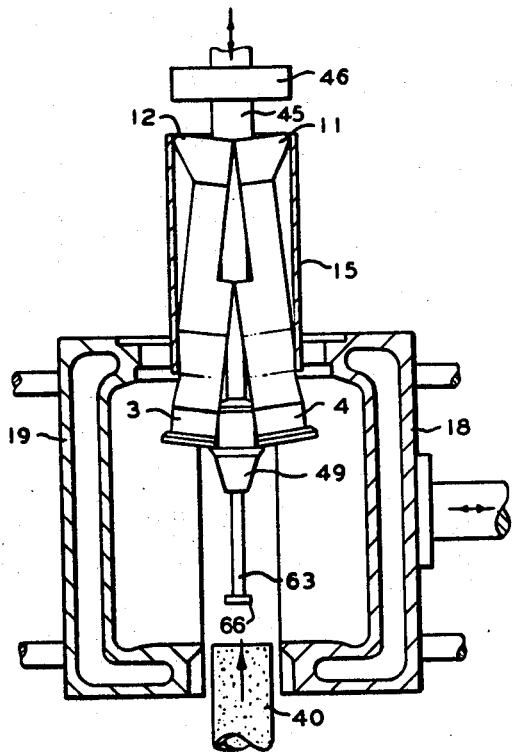
Figure 4:
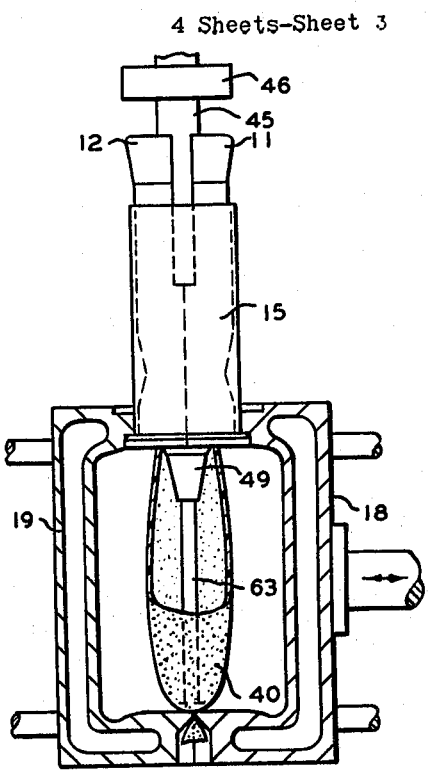
Figure 6:
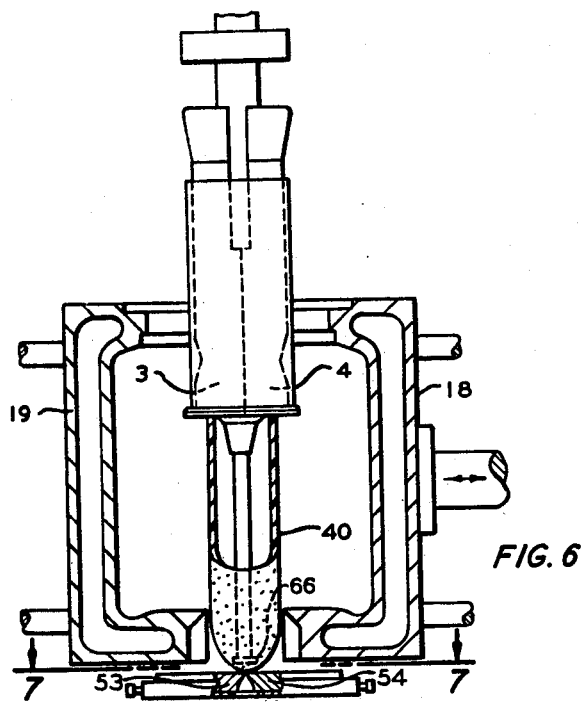
Figure 5:
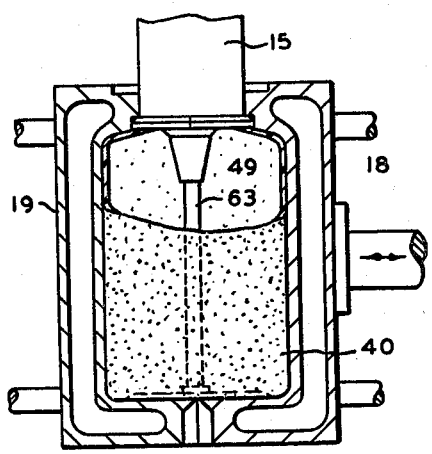
Figure 7:
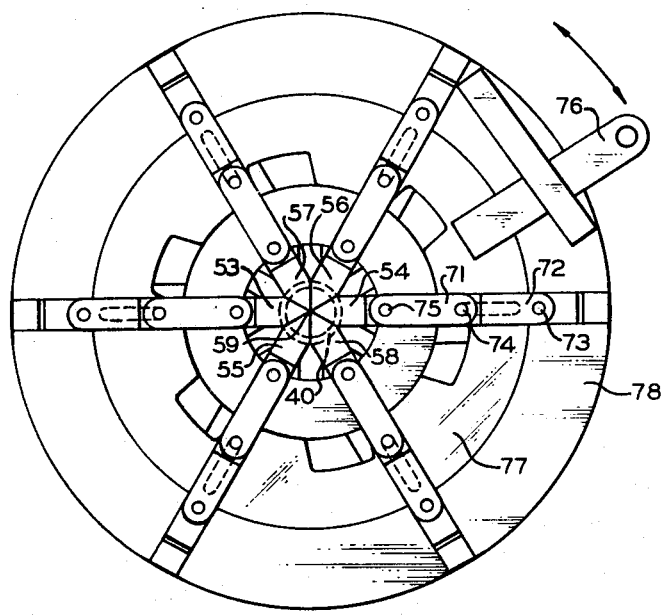
Figure 8:
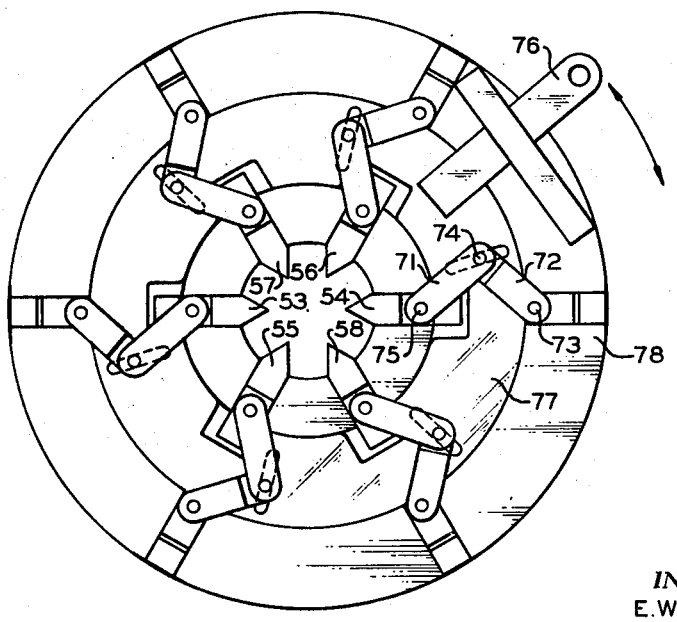

This invention relates to molding hollow articles. In one of its aspects it relates to a method for blow molding or vacuum molding hollow articles, the method comprising extrudting a hollow parison, stretching the hollow parison axially before or as it is expanded radially to biaxially orient the article. In another of its aspects it relates to a method of blow molding or vacuum molding an article wherein a threaded neck portion is formed in said hollow article as the hollow article is blow molded. In another of its aspects, the invention relates to a blow molding operation wherein a hollow parison is grasped at one end by a neck and thread forming means, the other end is grasped by a gripping and severing means which seals off the parison at that end, the seal area is pressed with a compressing means, the parison is stretched, a mold is closed around the parison, and the parison is expanded in a radial direction while a constant axial tension is maintained on the parison. In a more specific aspect of the invention, at least one of the neck and thread forming means and the gripping and severing means withdraw in an axial direction to deform the parison in the axial direction as the parison is molded. In another aspect of the invention, it relates to an apparatus for molding a hollow article wherein there is provided a means for clamping and severing one portion of a hollow parison, a means for providing a differential pressure between the inner portion of said parison and the outer portion of said parison, a retractable mold which is axially longer than said parison, a retractable means for gripping the other end of said parison and forming a threaded neck portion in said parison, and a means for retracting at least one of said clamping means and said neck forming means. In another of its aspects, the invention relates to an apparatus for blow molding a hollow article wherein there is provided six pinch jaws to seal off one end of a hollow open ended heated parison and a means for tamping the inner surface of the parison at the sealed off end to form a compression seal in the bottom of said heated parison.

Blow molded articles are well known in the art. The method is generally used for forming hollow articles such as bottles and jars made of thermoplastic material. The general method is to extrude a parison, to pinch off one end of the parison while severing or at least substantially severing the same from the extrudate, and applying a differential pressure between the inner and outer portions of the parison to expand the same, generally into a mold. Articles formed by this general method are circumferentially oriented and possess good mechanical properties in that direction. The mechanical properties in the axial direction are generally not as good due to the fact that the article is not significantly oriented in the axial direction. It has now been discovered that a blow molded article can be biaxially oriented by providing a parison slightly shorter than a mold into which it is placed, and by stretching the parison axially or providing a constant axial tension on the parison as it is blow molded to fill the mold.

It is, therefore, an object of this invention to provide a biaxially oriented hollow article.

It is a further object of this invention to provide a blow molded object of improved strength in the axial direction.

It is a further object of this invention to provide a fast, efficient, method for forming a hollow thermoplastic article with a threaded neck portion.

It is a still further object of this invention to provide an apparatus for making a hollow thermoplastic article with a threaded neck portion.

It is a still further object of this invention to provide a blow molded article from a hollow open ended parison, which article has an improved seal in the area in which the parison has been pinched off.

Other aspects, objects, and the several advantages of this invention are apparent to one skilled in the art from a study of this disclosure, drawings, and the appended claims.

According to the invention, a biaxially oriented hollow article is made by maintaining a constant tension on a hollow parison or by deforming the parison in an axial direction before or as it is expanded radially into a mold cavity. Further according to the invention, the parison is gripped at one end by a neck forming means and at the other end by a gripping means which seals it off and substantially severs it. During the blowing operation, at least one of the neck forming means and the bottom gripping means are withdrawn to provide a constant tension on the parison.

The invention can be best understood by reference to the accompanying drawing. FIGURE I is an isometric view of an apparatus according to the invention for forming blow molded hollow containers. FIGURE II is a sectional view of the apparatus taken along a vertical plane passing through line II—II. FIGURE III is a sectional view taken along a vertical plane passing through line III—III showing the first step of the process. FIGURE IV is a view similar to FIGURE III at a later stage of the process. FIGURE V is a view similar to FIGURE IV at a later stage of the process. FIGURE IV is a view similar to FIGURE III showing a modification of the apparatus according to the invention. FIGURE VII is a sectional view taken along line VII—VII of FIGURE VI showing the pinch off device. FIGURE VIII is a view similar to FIGURE VII showing the pinch off device in the open position.

Referring now to the drawings, parisons 40 are temperature conditioned and fed in between mold halves 18 and 19. The whole blowing apparatus is supported on frame 1 which can be any suitable structural shape such as an I beam. Air cylinder 44, plate support member 35, guide block 43, and guide member 16 are attached to frame 1. Referring specifically to FIGURE II, movable jaws 3 and 4 are provided with thread forming die 5 and 6. According to the invention, there can be two or more of these movable jaw members 3 and 4. Preferably, there will be three movable jaw members. In the uppermost position as shown in FIGURE II, the lowermost portions of movable members 3 and 4 are flush with the innermost surface of molds 18 and 19. In other words, the lowermost portions of movable jaw members 3 and 4 form a continuous surface with the inner surface of molds 18 and 19. A tapered guide tip 49 is provided on the end of air inlet tube 2 for guiding the parison in place and for keeping the parison walls apart. The middle portion of movable jaw members 3 and 4 are provided on the inner surface 7 and 8 with a groove surface which conforms to the shape of the outer portion of the air inlet tube 2. Members 3 and 4 are recessed at 36 and 37 in the outer central portion. The uppermost portions of movable jaw members 3 and 4 are provided on the inner side with recessed annular portions 13 and 14 and outwardly extending annular portions 11 and 12. It can be seen that unless constrained, the movable jaw members 3 and 4 can pivot around points 9 and 10. Movable members 3 and 4 are retained on the central shaft by cam tube 15 in which members 3 and 4 are adapted to slide axially. Tube 15 is held slidably in place by guide member 16, which is fixed to the frame of the apparatus. Attached to the upper end of tube 15 is plate member 23, which is attached to vertical shafts 27 and 28. In this embodiment, the shafts 27 and 28 are bolted to plate member 23. Air cylinders 25 and 26 activate shafts 27 and 28 in a vertical direction to move cam tube 15 up or down with respect to movable jaws 3 and 4. In so doing, the cam tube causes movable jaws 3 and 4 to open and close by pivoting around pivot points 9 and 10. Air cylinders 25 and 26 are supported by linkages 29 and 30 which in turn are connected to shafts 31 and 32. The entire blowing apparatus is supported by shafts 31 and 32, and moves up and down with vertical movement of shafts 31 and 32. Air cylinders 33 and 34 activate shafts 31 and 32. Plate support member 35 is attached to a rigid frame and supports air cylinders 33 and 34. Block mount 38 is supported by air cylinders 25 and 26. Mount 38 is rigidly attached to guide tube 39 which is slidably attached to the frame by guide block 43. A collar 64 restricts the downward movement to guide tube 39.

A pressure pin assembly consisting of a rod 63 with a tamping foot 66 which extends from the mold cavity through the movable jaw members 3 and 4, through the guide tube 39 and to air cylinder 44 is activated by cylinder 44 to move independently of the rest of the apparatus. Air cylinder 44 is rigidly attached to the frame.

Guide tube 39 also houses air inlet 42 which is connected to a channel 41 which is formed by the annular space between the rod 63 and air inlet tube 2, which is attached to guide tube 39 at the upper end an attached to tapered guide tip 49. Positioned over air inlet tube 2 is spacer 45, collar 46, and spacer-fulcrum tube 47, the lower end of which serves as pivot points for movable jaws 3 and 4.

Tapered guide tip 49 has above it and resting on it rubber compression ring 50, washer 51 and tapered compression washer 52. Rubber compression ring 50 is preferably made from a soft rubbery material which will expand radially when compressed axially. According to a preferred embodiment of the invention, the compression ring 50 will be slightly compressed when the jaws 3 and 4 are in the close position. As can be seen from the drawings, downward movement of the jaws with respect to the tapered guide tip 49 will compress compression member 50 more and cause it to expand radially.

A hollow tubular parison 40 is normally gripped at the bottom and sealed off with the bottom of the mold halves 18 and 29. In another embodiment of the invention as shown in FIGURES VI, VII and VIII, jaws 53 and 54 which pinch off the parison at the lower end are positioned below mold members 18 and 19. The jaws 53 and 54 are moved together and apart by conventional means such as hydraulic cylinders.

In operation, the movable jaws 3 and 4 are extended to the lowermost position as shown in FIGURE III by air cylinders 33 and 34. Air cylinders 25 and 26 actuate shafts 27 and 28 to pull upwardly cam tube 15, causing the cam tube to move upwardly with respect to movable members 3 and 4. This motion causes inward and upward pressure against ends 11 and 12, thus pivoting movable members 3 and 4 about points 9 and 10 so that the lower portions of jaws 3 and 4 will be positioned outwardly and the upper portions will be positioned inwardly. The parison is then inserted into position over guide tip 49 and compression ring 50, and against washer 51. Air cylinders 25 and 26 are actuated to move shafts 27 and 28 downwardly with respect to jaws 3 and 4, causing die portions 5 and 6 to close around the upper end of the parison. The mere closing of the jaws 3 and 4 exerts axial pressure on compression ring 50, thus causing it to expand slightly. A further downward movement of tube 15 with respect to jaws 3 and 4 causes ring 50 to be compressed in the axial direction more and expand more in the radial direction. This radial expansion of ring 50 forces the upper end of parison 40 to conform to the shape of the dies 5 and 6. In such a process, the neck of the article is formed. According to a preferred embodiment of the invention, a bottle with threads on the outer side of the neck is formed.

After the neck portion is formed, mold halves 18 and 19 close to seal, sever and clamp the opposite end of the parison, then air cylinder 44 actuates rod 63 with foot 66 to extend down to the bottom of parison 40 and press it against the bottom of the mold cavity. The pressure of this rod against the bottom of the parison aids in forming the bottom of the article as well as holds the bottom of the parison in the bottom of the mold cavity as the blowing optration takes place. In the event a closed end parison is used, rod 63, with foot 66, can be used to seat the closed end of such a parison against the mold cavity bottom during the blowing operation.

After the rod 63 with foot 66 is seated in the bottom, air cylinders 33 and 34 actuate shafts 31 and 32 to move upwardly block mount 38, guide tube 39, air inlet tube 2, cam tube 15 and jaws 3 and 4 in one continuous motion. This upward motion stretches the parison axially. FIGURE IV shows the condition of the parison and apparatus components at the completion of the above mentioned steps. Air or other suitable blowing fluid is introduced through an inlet 42 and passes through channel 41 into the inside of parison 40, causing it to expand. FIGURE V shows the completed bottle just after completion and prior to ejection The blowing operation can take place either during or after the stretching operation.

It is within the scope of the invention to provide vacuum ports in the mold halves to allow vacuum to be drawn between the mold cavity and the outside of the parison in lieu of, or in addition to, forcing air into the inside of the parison. In the vacuum operation, channel 41 could serve as a means for maintaining atmospheric pressure within the parison as it expands. The main object is to introduce a differential pressure between the inside and outside of the parison to allow radial expansion during or after axial stretching.

The combination of stretching and blowing will produce a biaxially oriented object. In a preferred embodiment of the invention, a biaxially oriented blow molded bottle is produced.

After the blowing operation is completed, the mold halves are opened, cam tube 15 is drawn upwardly to open jaws 3 and 4, and rod 63 with foot 66 can be moved slightly downwardly to free the blown object from the neck portion.

In the embodiment shown in FIGURES VI, VII and VIII, jaws 53 and 54 close off and grip the parison at the lower end after the parison has been inserted and clamped at the top by jaws 3 and 4.

In a preferred embodiment of the invention, jaws 53 and 54 represent two of a group of six such jaws, as shown in FIGURE VII and FIGURE VIII. The jaws 53, 54, 55, 56, 57 and 58 are arranged in a plane perpendicular to the longitudinal axis of the parison 40. Each jaw reciprocates axially in the plane toward and away from point 59, which, preferably, is the central longitudinal axis of parison 40. Each jaw is preferably separated by an angle of 60° around the point 59 in the plane of the jaws. Each jaw contains a 60° inclined angle tip which when coacting with the other jaws functions to seal off parison 40 into a point at 59. The jaws need not be disposed at angles of 60° from each other, but may be at any angle whatsoever so long as the jaws coact to pinch and/or seal off parison 40 at a point. Further, it is obvious that a greater or lesser number of jaws can be provided without departing from the scope of the invention.

In the embodiment shown in FIGURES VII and VIII, the jaws are actuated by a three pin toggle arrangement attached to each jaw. Toggle member 71 is pivotably attached at 75 to jaw 54 and is pivotably attached to toggle member 72 and ring member 77 at pin 74. Toggle member 72 is pivotably attached to fixed structure 78 at 73. A motion limiting bar, member 76, is fixedly attached to ring member 77, which is rotatable about point 59 and independent of the fixed structure 78.

In operation, motion limiting bar member 76 is reciprocated in the direction indicated by the arrow, whereupon ring member 77 rotates about point 59. This rotary movement causes toggle members 71 and 72 to be angularly displaced, thus pulling jaw 54 away from central point 59. The action is reversed to cause jaw 54 to approach central point 59.

Each of the jaws will have a mechanism similar to the above described toggle arrangement to actuate each jaw to operate in unison with the other jaw. Other means, such as hydraulic cylinders, can also be used to actuate the jaws in unison.

In the actual molding operating, the jaws are in the retracted position as the parison is inserted into the opening between them. When the parison is in position, the thread-forming dies close over the upper portion of the parison as hereinbefore described. The parison is then pinched off and sealed at the lower portion thereof by the jaws 53, 54, 55, 56, 57 and 58.

Rod 63 with foot 66 presses the closed off area in the bottom of the parison against the face of jaws 53, 54, 55, 56, 57 and 58. The jaws 3 and 4 are raised to stretch the parison after jaws 53–58 are closed further to completely pinch off or sever the parison. Next, jaws 3 and 4 and foot 66 are raised to position the parison between the mold halves 18 and 19 and the mold halves are closed. The rod 63 with foot 66 is actuated to press the bottom of the parison against the bottom of the mold and the jaws 3 and 4 are raised to their final position in the top of the mold before or as the parison is blown. The foot can cool the parison in the seal area so that deformation does not take place in the seal area as the parison is longitudinally stretched.

In carrying out the invention, it is desirable to maintain a ratio of axial expansion to circumferential expansion in the range of 1:4 to 2:1, preferably in the range of 1:2 to 1:1. The circumferential expansion ratio should be in the range of 2:1 to 10:1 and the axial expansion ratio should be in the range of at least 1:1 to 8:1, preferably 1.5:1 to 2.5:1.

It has been found that by stretching the parison axially as it is blown and expanded circumferentially, the blowing time, and thus the residence time, of the parison in the blow mold can be decreased many fold. For example, bottles, drawn axially while being blown, could be blown at an air introduction rate of 20–30 CFM while bottles blown with no axial draw were blown at the rate of 1 CFM.

The parisons used in the apparatus of the invention were preformed and preheated to a temperature just below the crystalline melt temperature of the material. The suitable temperature for polypropylene resins would be in the range of 300–350° F., and preferably in the range of 320–340° F.

*Specific example*

A 0.91 density polypropylene having a melt flow of 1.05 (ASTM D 1238–57T Condition L) is formed into a 0.87 inch diameter tube 3¼ inches long and having a wall thickness of 0.12 inch over most of its length. The end of this tube on which the threads are to be formed has a wall thickness of 0.09 inch for a distance of 0.5 inch from the end. This tube is inserted into an electrically heated aluminum block and heated to about 324° F. It is then removed from the aluminum block and inserted into position over the guide tip and compression ring of a machine similar to that shown in FIGURE II. The three thread forming jaws are closed, thus forming the threads and clamping the top of the parison. The six movable jaws are then closed, sealing off the bottom end of the parison, then a stamper foot compresses the seal. Next, the six jaws close further, completely severing the bottom of the parison, and the thread former is raised to stretch the parison to approximately twice its original length. The parison is held in this stretched condition and moved between the mold halves, they are closed about the parison, and it is blown to the shape of the mold cavity. The mold is then opened, the neck unclamped, and the bottle removed. A 10 ounce capacity oriented polypropylene bottle cylindrically shaped, having a high degree of clarity, results. A drop test consisting of dropping the bottle full of water at 54° F. from a height of five feet, was performed on the bottle. No failure resulted from the drop test.

It is within the scope of the invention to provide, in lieu of the pinching off means as shown in FIGURES VI, VII and VIII, a pinching means which can extend into the mold cavity in a similar manner as the thread and neck forming means. This alternate type of pinching means can seal off the lower end of the parison and be retracted flush with the mold walls to axially stretch the parison prior to or during the blowing operation.

Reasonable variation and modification are possible within the scope of the foregoing disclosure, drawings and the appended claims to the invention, the essence of which is that a method and apparatus are provided to biaxially orient a thermoplastic article, the method comprising maintaining axial tension on a parison prior to or as the parison is being radially deformed, the apparatus comprising a retractable means for gripping one end of a parison, said retractable means being adapted to maintain axial tension on a parison as the parison is expanded; and the apparatus comprising a multi-jawed seal-off device to pinch off a hollow ended parison into a point in combination with a tamping foot which acts on the inner portion of the parison at the seal to provide an improved seal.

We claim:
1. Apparatus for forming hollow articles comprising:
   (1) parison gripping means having guide means adapted to enter a first end of a parison, jaw means adapted to enclose said guide means to clamp said first end of said parison therebetween, and means to actuate said jaw means to so clamp said parison;
   (2) stretching means extending from said guide means so as to be enclosed by said parison, said stretching means having a tamping foot on the end thereof;
   (3) a separable hollow mold, and means to close said mold about said parison held by said guide means and said jaw means so as to pinch off a second end of said parison;
   (4) means to move said stretching means relative to said mold to press said pinched off second end of said parison between said tamping foot and said mold;
   (5) means to move said guide means and jaw means relative to said tamping foot and mold so as to stretch said parison clamped therebetween; and
   (6) means for creating a pressure differential between the interior of said parison and said mold so as to cause said parison to conform to the shape of said mold.

2. Apparatus for forming hollow articles comprising:
   (1) parison gripping means having guide means adapted to enter a first end of a parison, jaw means adapted to enclose said guide means to clamp said first end of said parison therebetween, and means to actuate said jaw means to so clamp said parison;
   (2) stretching means extending from said guide means so as to be enclosed by said parison, said stretching means having a tamping foot on the end thereof;
   (3) parison pinching means spaced from said gripping means and adapted to enclose and pinch off a second end of said parison held by said gripping means;
   (4) means to move said stretching means relative to said pinching means to press said pinched off second end of said parison between said tamping foot and said pinching means;
   (5) means to cause relative movement between (a) said stretching means and pinching means and (b) said guide means and jaw means, so as to stretch said parison clamped therebetween;
   (6) a separable hollow mold, and means to close said mold about the stretched parison; and
   (7) means for creating a pressure differential between the interior of said parison and said mold so as to cause said parison to conform to the shape of said mold.

3. An apparatus for forming biaxially oriented hollow thermoplastic articles comprising:
   (1) a gripping means having
      (a) a tapered guide for insertion into an open first end of a temperature conditioned parison;
      (b) at least two pivotable jaws being adapted to grip said open end of said parison so that said jaws in closed position form a concentric ring around said open end of said parison, said jaws having die portions suitable for forming a neck portion of said article; and
      (c) means for opening and closing of said jaws;
   (2) a reciprocal means extending through the central portion of said gripping means and said guide, said means having a tamping foot adapted to press against a closed off second end of said parison;
   (3) means to cause relative movement between said gripping means and said tamping foot in order to apply axial stretching to said parison;
   (4) a separable hollow mold, comprising at least two mold parts;
   (5) means for separating and bringing together said mold parts; and
   (6) means for creating a pressure differential between the interior of said parison and said hollow mold so as to cause said parison to conform to the shape of said mold.

4. Apparatus according to claim 3 wherein said means for creating a differential pressure is a means for introducing a fluid pressure into the interior of said parison.

5. Apparatus according to claim 3 wherein each of said pivotal jaws comprises:
   (1) a first end portion having a thread forming means on the inner portion thereof;
   (2) a central portion having
      (a) a rounded area on the inner portion thereof enabling said jaw to extend a portion of the distance around a central tube;
      (b) a gradually sloping recessed area in the outer portion thereof serving as a cam surface;
      (c) a pivot point;
   (3) a second end portion having an inner portion recessed and having an outer portion with an outwardly sloping cam surface; and
wherein said means for opening and closing said jaws comprises a cylindrical cam tube encircling said jaws.

6. Apparatus according to claim 3 wherein said gripping means is vertically reciprocal.

7. An apparatus for forming a hollow article according to claim 3 comprising in addition: a compression ring above said guide adapted to have said open end of said parison fit over said compression ring; a tapered compression washer above said compression ring, said washer coacting with the inner portion of said jaws to apply downward pressure on said compression ring as said jaws close, hereby expanding said ring in a radial direction; and means for providing relative axial movement between said guide and said washer to further compress said ring.

8. Apparatus according to claim 3 further comprising: means for pinching and sealing said second end of said parison to form said closed off end, and means for causing said tamping foot to press said pinched off second end of said parison against said pinching and sealing means.

9. Apparatus according to claim 8 wherein said pinching and sealing means comprises:
   (1) six pointed jaw members arranged in a plane perpendicular to the axis of said parison, each of said pointed members being adapted to reciprocate radially to said parison axis, each of said pointed members being about 60° from another of said pointed members;
   (2) a rotating ring member,
   (3) a fixed structure surrounding said ring member;
   (4) a first set of six toggle members corresponding to said six jaw members, each of said first toggle members pivotally attached at one end of each of said jaw members, respectively, and pivotally attached at the other end to said ring structure; and
   (5) a second set of six toggle members corresponding to said first set of six toggle members, each of said second toggle members pivotally attached at one end to each of said first toggle members, respectively, at the point of attachment of said first toggle members to said ring structure, and at the other end pivotally and slidably attached to said fixed structure.

References Cited

UNITED STATES PATENTS

| | | |
|---|---|---|
| 2,903,740 | 9/1959 | Parfrey. |
| 2,940,120 | 6/1960 | Grebowiec. |
| 3,311,684 | 3/1967 | Heider. |
| 3,324,214 | 6/1967 | Schaich. |

WILBUR L. McBAY, *Primary Examiner.*